(12) United States Patent
Mi et al.

(10) Patent No.: US 7,743,412 B1
(45) Date of Patent: Jun. 22, 2010

(54) COMPUTER SYSTEM IDENTIFICATION

(75) Inventors: James Q. Mi, Sunnyvale, CA (US); Vishesh Parikh, Mountain View, CA (US); Albert Y. Teng, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/259,620

(22) Filed: Feb. 26, 1999

(51) Int. Cl.
*G06F 13/00* (2006.01)

(52) U.S. Cl. .............. 726/20; 726/9; 713/159; 713/171; 380/283

(58) Field of Classification Search .......... 713/168, 713/176, 200, 159, 171, 179; 380/283, 285; 705/67, 72; 726/9, 20, 30; 902/26
See application file for complete search history.

(56) References Cited

U.S. PATENT DOCUMENTS

| | | | | |
|---|---|---|---|---|
| 5,120,939 A | * | 6/1992 | Claus et al. ............. | 235/382 |
| 5,424,727 A | * | 6/1995 | Shieh ..................... | 235/384 |
| 5,636,280 A | | 6/1997 | Kelly | |
| 5,708,710 A | * | 1/1998 | Duda ..................... | 380/247 |
| 5,774,544 A | * | 6/1998 | Lee et al. ............... | 713/189 |
| 5,784,463 A | | 7/1998 | Chen et al. | |
| 5,790,663 A | * | 8/1998 | Lee et al. ............... | 705/56 |
| 5,805,701 A | * | 9/1998 | Ryan, Jr. ................ | 705/60 |
| 5,825,884 A | * | 10/1998 | Zdepski et al. .......... | 380/30 |
| 5,850,446 A | * | 12/1998 | Berger et al. ........... | 380/59 |
| 5,933,620 A | * | 8/1999 | Lee et al. ............... | 716/1 |
| 5,956,715 A | * | 9/1999 | Glasser et al. .......... | 707/9 |
| 5,959,621 A | * | 9/1999 | Nawaz et al. ........... | 345/733 |
| 5,978,482 A | * | 11/1999 | Dwork et al. ........... | 380/282 |
| 6,055,536 A | * | 4/2000 | Shimakawa et al. .... | 707/101 |
| 6,081,793 A | * | 6/2000 | Challener et al. ....... | 235/386 |
| 6,144,991 A | * | 11/2000 | England .................. | 709/205 |
| 6,148,342 A | * | 11/2000 | Ho ........................ | 709/223 |
| 6,154,214 A | * | 11/2000 | Uyehara et al. ......... | 345/835 |
| 6,195,432 B1 | * | 2/2001 | Takahashi et al. ....... | 380/277 |
| 6,327,578 B1 | * | 12/2001 | Linehan ................. | 705/65 |

FOREIGN PATENT DOCUMENTS

JP       1-100654      4/1989
JP      10-340255    12/1998

OTHER PUBLICATIONS

Schneier, Bruce, Applied Cryptography, John Wiley & Sons, Inc. $2^{nd}$ ed., pp. 53-54, 185-186.*
Schneier, Bruce, Applied Cryptography 1996, John Wiley & Sons, Inc., 2nd ed., pp. 458-459.*

* cited by examiner

*Primary Examiner*—Michael Pyzocha
*Assistant Examiner*—Paul Callahan
(74) *Attorney, Agent, or Firm*—Trop, Pruner & Hu, P.C.

(57) ABSTRACT

A computer system includes an interface and a processor. The interface is adapted to receive a request from another computer system for identification of the first computer system. The adapter also furnishes a hash value that identifies the first computer system to the other computer system. The processor is coupled to the interface and is adapted to encrypt an identifier that identifies the first computer system with a key associated with the other computer system to provide the hash value.

13 Claims, 4 Drawing Sheets

COMPUTER SYSTEM IDENTIFICATION

BACKGROUND

The invention relates to computer system identification.

A server (an Internet server, for example) may furnish a web site that provides a particular service. In this manner, a user of the web site may communicate with the web site via a client computer system. Sometimes the server may control access to the web site so that only a select group of users may access the service provided by the web site.

The ubiquitous use of e-mail and the rapid growth of community and chat-based web sites allow Internet users to reach out and interact with people whom they have never met. Unfortunately, not all individuals who participate in these forums are well-intentioned. Despite the fact that most chat-rooms use such access controls as a user name and password to control access to the community, a few users, after being denied access for inappropriate behavior, may circumvent these access controls. For example, a banned user may assume a new user name to regain access to the chat area and continue the disruptive behavior. This circumvention may allow single individuals to destroy the efforts of a group of people and lessen their enjoyment of the online experience.

An embedded identifier, such as a processor serial number (hereinafter called a "processor number"), may offer an effective means of deterring the above-described behavior by identifying the computer system that accesses the web site. For special chat rooms which require extra accountability, such as chat rooms for minors, web sites may create responsible chat environments where codes of conduct are enforceable and reliable by requiring that individuals provide their processor number (in addition to their name and password) to gain access to the chat room. If every member of a chat area volunteers his or her processor number, the net result is a more secure community that may more effectively deal with potentially threatening behavior. After all, if problem users volunteer to participate in a room that not only encourages but enforces responsible behavior via the use of processor numbers, their ability to regain denied access to the chat room may be thwarted, even if the problem users change their user names.

Unfortunately, the use of an embedded identifier to identify the client computer system may present difficulties. For example, the number may be used to build a trail of information that links the user to different databases that are maintained on the Internet. These databases, in turn, may be correlated to build a vast database of private information about the user. Although, it is unlikely that such a database could be built given the fact that the user may have the capability to disable the processor number identification, there is a continuing need to enhance the user's privacy protection.

SUMMARY

In one embodiment of the invention, a method includes receiving a request from a first computer system for identification of a second computer system and retrieving an identifier that identifies the second computer system. The identifier is encrypted with a key that is associated with the first computer system to produce a hash value. The hash value is provided to the first computer system in response to the request.

In another embodiment, a computer system includes an interface and a processor. The interface is adapted to receive a request from another computer system for identification of the first computer system. The interface furnishes a hash value that identifies the first computer system to the other computer system. The processor is coupled to the interface and is adapted to encrypt an identifier that identifies the first computer system with a key associated with the other computer system to produce the hash value.

In another embodiment, an article includes a storage medium readable by a first processor-based system. The storage medium stores instructions to cause a processor to receive a key from another system for identifying the first system and determine whether the key is valid. Based on the identification, the instructions cause the processor to selectively authorize encryption of an identifier that identifies the first system with the key to produce a hash value.

In yet another embodiment, a microprocessor includes an instruction unit, an execution unit and a bus interface unit. The instruction unit is adapted to indicate when the instruction unit receives an instruction that requests an identify that identifies the microprocessor. The execution unit is coupled to instruction unit and adapted to, in response to the indication from the instruction unit, encrypt a key with an identifier that identifies the microprocessor to produce a hash value. The bus interface unit is coupled to the execution unit and is adapted to furnish an indication of the hash value to external pins of the microprocessor.

DETAILED DESCRIPTION

Figure 1:
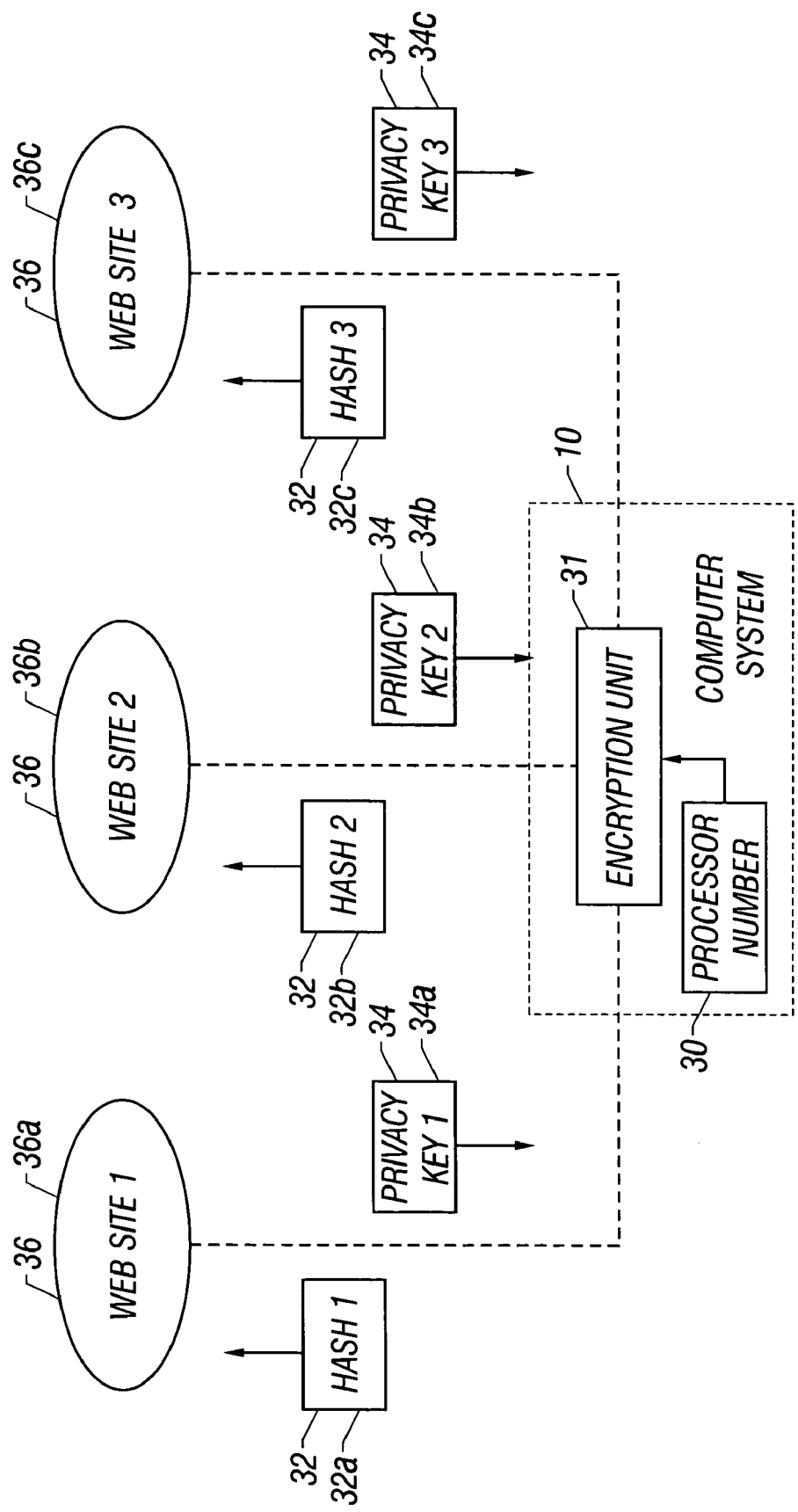
FIG. 1 is a schematic diagram of a network according to an embodiment of the invention.

Referring to FIG. 1, an embodiment 10 of a computer system in accordance with the invention includes an encryption unit 31 that may receive identification requests from web sites 36 (web sites 36a, 36b and 36c, as examples) for an identity of the computer system 10. In response to these requests, the encryption unit 31 may furnish different hash values 32 (hash values 32a, 32b and 32c, as examples) to the different web sites 36. In some embodiments, each hash value 32 is different, and as a result, each web site 36 may identify the computer system 10 by a different hash value 32, although each of the hash values 32 is generated by a single processor number 30, as described below. Because each web site 36 associates the computer system 10 with a different hash value 32, information about a user of the computer system 10 may not be correlated between databases that are maintained by different web sites 36. For example, a particular web site 36 may identify the computer system 10 via the hash value "1bdf23" and another web site 36 may identify the computer system 10 via the hash value "53gh44." Furthermore, as described below, the manner in which the encryption unit 31 generates the hash values 32 makes it very difficult for a rogue web site 36 from obtaining the hash values 32 that identify the computer system 10 to other web sites 36. Therefore, due to the technique used by the encryption unit 31, it may be very different to correlate information about the user from databases that are maintained by different web sites 36. In this context, the term "web site" generally refers to an arrangement where a computer system (a server, for example) executes software to provide a service to other computer systems, such as the computer system 10.

In the context of this application, the phrase "computer system" may generally refer to a processor-based system and may include (but is not limited to) a graphics system, a desktop computer, a mobile computer (a laptop computer, for example), or a set-top box as just a few examples. The term "processor" may refer to, as examples, at least one central processing unit (CPU), microcontroller, X86 microprocessor, Advanced RISC Machine (ARM) microprocessor or Pentium-based microprocessor. The examples listed above are not intended to be limiting, but rather, other types of computer systems and other types of processors may be included in some embodiments of the invention.

Figure 3:
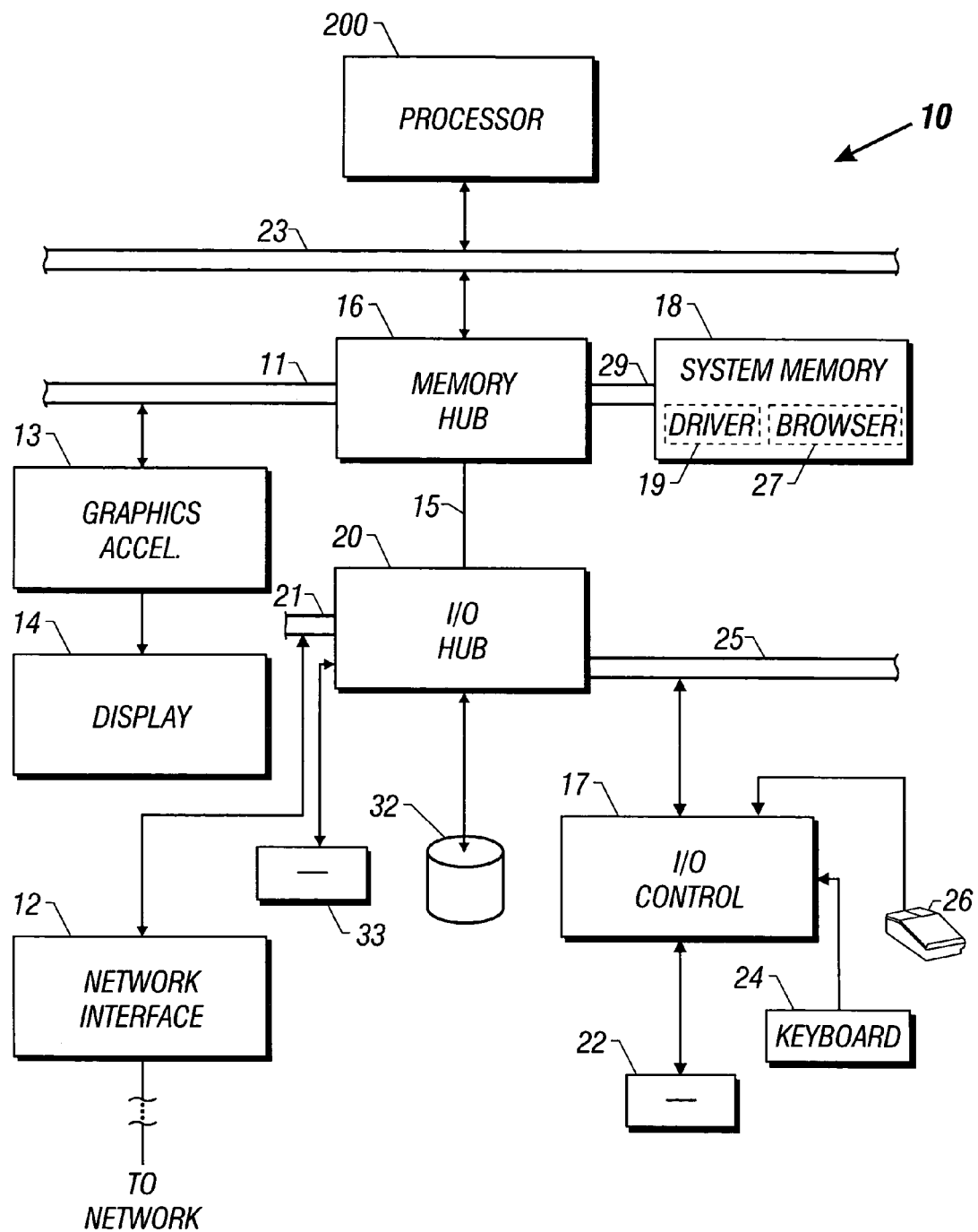
FIG. 3 is a more detailed schematic diagram of a computer system of FIG. 1 according to an embodiment of the invention.

To obtain a hash value 32 that identifies the computer system 10, a particular web site 36 may transmit a privacy key 34 (privacy keys 34a, 34b and 34c, as examples) to the computer system 10. In response, the encryption unit 31 may encrypt an embedded identifier, such as a processor number 30, with the privacy key 34 to produce the hash value 32 that the computer system 10 furnishes to the requesting web site 36. In this manner, if each web site 36 transmits a different privacy key 34 to the computer system 10, then each web site 36 receives a different hash value 32, each of which indicates the computer system 10 to the particular web site 36. As described further below, the encryption unit 31 may include a processor 200 (see FIG. 3) to aid in the encryption of the privacy key 34 with the processor number 30.

The privacy key 34 may or may not be a private key, depending on the particular embodiment. For example, in some embodiments, the privacy key 34 may be derived from an address or universal resource locator (URL) for the web site 36. Therefore, as an example, the privacy key 34 may indicate a string, such as "www.example.com." As described below, for the embodiments where the privacy key 34 is derived from the URL, the computer system 10 may perform a validity check to determine if the privacy key 34 that is furnished by a particular web site 36 is based on the URL of the web site 36.

In some embodiments, the encryption unit 31 may use a hash function called F(PN, PRIVACYKEY) to perform the encryption. The F(PN, PRIVACYKEY) function may have properties that make it more difficult to track user information (about the computer system 10) that is stored on different web sites 36. For the F(PN, PRIVACYKEY) hash function, the notation "PN" represents the processor number 30, and the notation "PRIVACYKEY" represents the privacy key 34.

One of the properties of the F(PN, PRIVACYKEY) hash function may be that the F(PN, PRIVACYKEY) function is a one way hash function, a notation that implies given the hash value 32 and the privacy key 34, it may be very difficult, if not impossible, to work backwards to determine the processor number 30. As a result, it may be very difficult for a particular web site 36 to use the hash value 32 that is obtained by that web site 36 to derive the processor number 30.

In some embodiments, another property of the F(PN, PRIVACYKEY) function may be that the F(PN, PRIVACYKEY) function is collision free, a term that means that it is highly unlikely for the F(PN, PRIVACYKEY) hash function to return the same hash value for different privacy keys 34. Thus, it may be highly unlikely for a particular website 36 to use the F(PN, PRIVACYKEY) function (with its associated privacy key 34) to obtain the same hash value 32 for two different processor numbers 30. Thus, this feature ensures that it is highly likely for a particular web site 36 to identify each computer system with a different, unique processor number 30.

Yet another property of the F(PN, PRIVACYKEY) function (in some embodiments) may be that the F(PN, PRIVACYKEY) function is non-commutative, as described below:

F(F(PN,PRIVACYKEY),PRIVACYKEY'))≠F(F(PN,PRIVACYKEY'),PRIVACYKEY)), where "PRIVACYKEY'" represents a privacy key 34 that is different from the privacy key 34 that is represented by "PRIVACYKEY." As a result of the non-commutative property, it may be very difficult to correlate the information that is associated with the computer system 10 (and user) on different databases (on different web sites 36) when different privacy keys 34 are used.

Many different hash functions may be used, in various embodiments, that satisfy one, more than one, or all of the properties described below. For example, in some embodiments, a secure hash algorithm (SHA), an algorithm that satisfies all of the properties described above, may be used.

In some embodiments, the computer system 10 may notify the user of the system 10 when a particular web site 36 is requesting system identification. For example, this notification may be in the form of a prompt in a window that is formed on a display 14 (see FIG. 3) of the computer system 10. In this manner, the user may either permit the web site 36 to obtain the identification (provided by the hash value 32) or reject the request. In some embodiments, the user may have an option to turn off the prompt.

Figure 2:
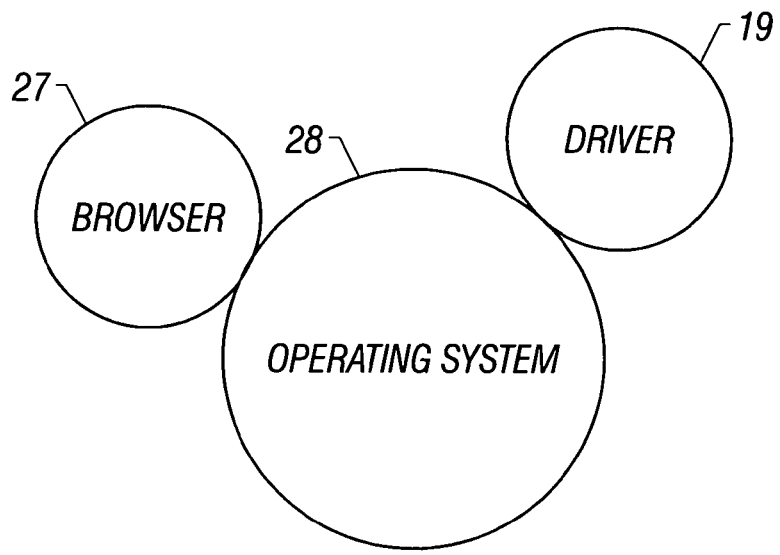
FIG. 2 is an illustration of software executed by a computer system of FIG. 1 according to an embodiment of the invention.

Besides prompting the user about the identification request, the computer system 10 may take measures to prevent a rogue web site 36 from submitting an incorrect privacy key 34 for purposes of obtaining a hash value 32 that is associated with another web site 36. For example, in some embodiments, the request for identification may involve a two-part identification procedure. First, the web site 36 sets the privacy key 34 by executing (if authorized, as described below) an instruction (called SETKEY(PRIVACYKEY)) of the processor 200 (see FIG. 2). Referring to FIG. 2, as described below, the SETKEY(PRIVACYKEY) function may be associated with ring zero (i.e., the highest level) of an operating system 28. As a result, the computer system 10 may not permit execution of this processor instruction until the computer system 10 validates the provided privacy key 34 by executing a software program called a driver 19. After the privacy key 34 is validated by execution of the driver 19, the web site 36 may then be authorized to execute a processor instruction called HWID( ) (i.e., the HWID( ) instruction may not have an input parameter) that is associated with ring three (i.e., a lower privilege level) of the operating system 28 to obtain the hash value 32.

More particularly, in some embodiments, the above-described identification procedure may involve interaction between the operating system 28, an Internet browser 27 (Internet Explorer® or Netscape Navigator®, as examples) and the driver 19. For example, because the SETKEY(PRIVACYKEY) instruction is associated with ring zero, the web site 36 may not by itself cause execution of the instruction to obtain the hash value 32, as the web site 36 may only have access to ring three (a lower privilege level) and higher rings (i.e., even lower privilege levels) of the operating system 28. However, the driver 19 may have ring zero privileges and thus, may form a bridge between the web site 36 and the ring zero privileges of the operating system 28. In this manner, when the web site 36 attempts to execute SETKEY(PRIVA-CYKEY) instruction, the driver 19 may be called by the operating system 28 to cause the processor 200 to validate the privacy key 34 before providing the hash value 32. In the execution of the driver 19, the processor 200 may use results obtained from the execution of the browser 27 to validate the privacy key 34, as described below.

Figure 4:
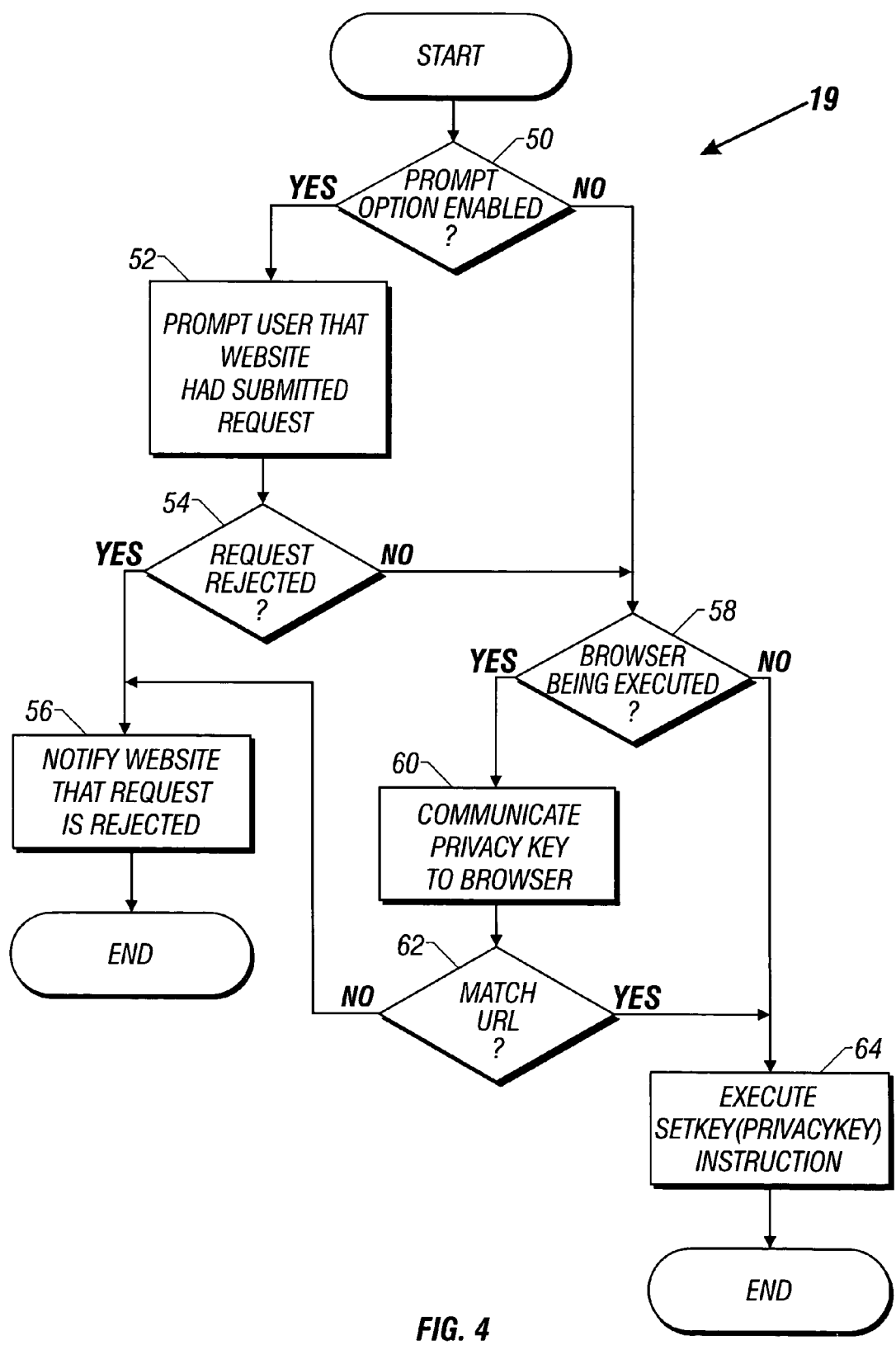
FIG. 4 is an illustration of the execution of an algorithm according to an embodiment of the invention to control identification requests by a processor of the computer system of FIG. 3.

Referring to FIG. 4, when executed by the processor 200, the driver 19 may cause the processor 200 to perform the following functions. In particular, the driver 19 may cause the processor 200 to determine (diamond 50) if the user has enabled an option to prompt the user when an identification request is received. If so, the processor 200 prompts (block 52) the user (via the display 14 (see FIG. 2), for example) that a web site 36 has submitted an identification request and waits for the user to indicate (via a keyboard 24 or move 26 (see FIG. 2), as examples) whether the user desires to reject the request. If so, the processor 200 rejects the request by notifying (block 56) the web site 36.

However, if the user did not reject the request, then the processor 200 may determine (diamond 58) whether the browser 27 is currently being executed. If so, the program 19 causes the processor 200 to communicate (block 60) the privacy key 34 to the browser 27 so that when the processor 200 executes the browser 27 (on another thread, for example), the processor 200 may compare the URL of the web site 32 to the privacy key 34. Subsequently, the processor 200, communicates the results of the comparison for use by the driver 19. In this manner, when the processor 200 subsequently executes the driver 19, the processor 200 determines (diamond 62) whether the privacy key 34 matches the URL of the web site 36. If not, the processor 200 rejects the request and notifies (block 56) the web site 36 about the rejection of the identification request. Otherwise, the processor 200 executes (block 64) the SETKEY(PRIVACYKEY) instruction to set the privacy key to be used for the encryption of the processor number 30. In this manner, the web site 36 that submitted the privacy key 34 may cause the processor 200 to execute the HWID( ) instruction to cause the processor 200 to produce an indication of the hash value 32. However, if the privacy key 34 has not been set, then the processor 200 returns an indication of an error rather than the indication of the hash value 32.

Referring back to FIG. 3, in some embodiments, the computer system 10 may include a bridge, or memory hub 16. The processor 200 and the memory hub 16 may be coupled to a host bus 23. The memory hub 16 may provide interfaces to couple the host bus 23, a memory bus 29 and an Accelerated Graphics Port (AGP) bus 11 together. The AGP is described in detail in the Accelerated Graphics Port Interface Specification, Revision 1.0, published on Jul. 31, 1996, by Intel Corporation of Santa Clara, Calif. The system memory 18 may be coupled to the memory bus 29, and store the driver 19, the browser 27 and portions of the operating system 28 (not shown in FIG. 3). A graphics accelerator 13 (that controls the display 14) may be coupled to the AGP bus 11. A hub communication link 15 may couple the memory hub 16 to another bridge circuit, or input/output (I/O) hub 20.

In some embodiments, the I/O hub 20 includes interfaces to an I/O expansion bus 25 and a Peripheral Component Interconnect (PCI) bus 21. The PCI Specification is available from The PCI Special Interest Group, Portland, Oreg. 97214. A network interface 12 (a modem or a local area network (LAN) card, as examples) may be coupled to the PCI bus 21 and provide a communication path for the computer system 10 to communicate with the web sites 36. In this manner, the processor 200 may interact with the network interface 12 to communicate with the web sites 32. The I/O hub 20 may also include interfaces to a hard disk drive 37 and a CD-ROM drive 33, as examples. An I/O controller 17 may be coupled to the I/O expansion bus 25 and receive input data from the keyboard 24 and the mouse 26, as examples. The I/O controller 17 may also control operations of a floppy disk drive 22. Copies of the driver 19 may be stored on, as examples, the hard disk drive 32, a diskette or a CD-ROM, as just a few examples.

Figure 5:
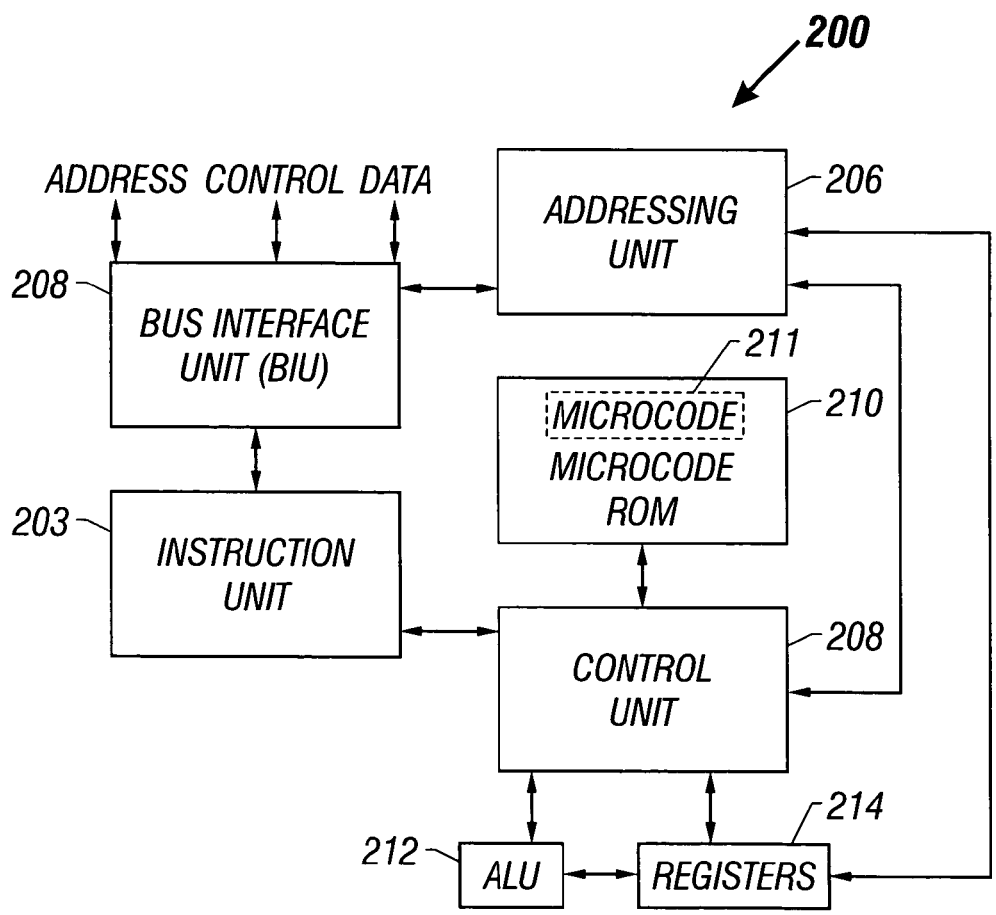
FIG. 5 is a schematic diagram of the processor of FIG. 3 according to an embodiment of the invention.

Referring to FIG. 5, as an example, the processor 200 may include a bus interface unit (BIU) 208 that is coupled to address, control and data lines of the host bus 23 to, among other operations, retrieve instructions and data from the system memory 18. For the instructions, the processor 19 may include an instruction unit 203 that is coupled to the bus unit 208 to decode the instructions. In this manner, the instruction unit 203 may have buffers and a cache to store the instructions. A control unit 208 (of the processor 200) may receive signals from the instruction unit 203 that indicate the decoded instructions. For example, the signals may indicate the instruction to perform the SETKEY(PRIVACYKEY) function or the instruction to perform the HWID( ) function.

In response to the instruction that is indicated by the instruction unit 203, in some embodiments, the control unit 208 may retrieve corresponding elementary instructions, called microcode, from a microcode read only memory (ROM) 210 of the processor 200 and execute the microcode. For example, microcode 211 to cause the processor 200 to perform the SETKEY(PRIVACYKEY) and HWID( ) instructions may be stored in a microcode read only memory (ROM) 210. In performing the execution of an instruction, the control unit 208 may control an arithmetic logic unit (ALU) 212, registers 214 and an addressing unit 206.

Other embodiments are within the scope of the following claims. For example, in other embodiments, the circuitry to perform the SETKEY(PRIVACYKEY) and HWID( ) instructions may be hardwired instead of being implemented in microcode. The processor number 30 may be replaced by another identifier that identifies the computer system 10. A privacy key other than a string that indicates an URL may be used. Applications other than applications being executed by web sites may request identification of the computer system 10. For example, other computer systems that are connected through a local area network (LAN) may request identification from the computer system 10.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising: receiving, over a global computer network, an unsolicited request from a first computer system coupled to the global computer network for a second computer system coupled to the global computer network to provide an identification of the second computer system;

in response to the request, providing a visual interface on the second computer system to notify both a user of the second computer system of the request and prompt the user to allow or deny the request; and in response to the user allowing the request providing a hash value to the first computer system, the hash value being generated by encryption of a key associated with a first computer system with an identifier that identifies the second computer system, and based on a response of the user to the request, selectively communicating the key to a browser of the second computer system.

2. The method of claim 1, wherein the identifier that identifies the second computer system comprises a processor number.

3. The method of claim 1, wherein the key indicates an address of a web site of the first computer system.

4. The method of claim 1, wherein the first computer system is located at a remote location relative to the second computer system.

5. The method of claim 1, further comprising:
providing an error indication to the first computer system in response to the user denying the request.

6. An article comprising a storage medium readable by a first processor-based system, the storage medium storing instructions to cause a processor of the first processor-based system to:
receive an unsolicited request over a global computer network from a first computer system coupled to the global computer network for a second computer system to provide an identification of the second computer system;
in response to the request, provide a visual interface on the second computer system to notify both a user of the second computer system of the request and prompt the user to allow or deny the request; and
in response to the user allowing the request, provide a hash value to the first computer system, the hash value being generated by encryption of a key associated with the first computer system with an identifier that identifies the second computer system, and
based on a response of the user to the request, selectively communicating the key to a browser of the second computer system.

7. The article of claim 6, wherein the identifier that identifies the second computer system comprises a processor number.

8. The article of claim 6, wherein the key indicates an address of a web site of the first computer system.

9. The article of claim 6, wherein the first computer system is located at a remote location relative to the second computer system.

10. A system comprising:
a database; and
a first computer coupled to the database to:
receive an unsolicited request over a global computer network from a second computer coupled to the global computer network for the first computer to provide an identification of the first computer;
in response to the request, provide a visual interface on the first computer to notify both a user of the first computer of the request and prompt the user to allow or deny the request; and
in response to the user allowing the request, provide a hash value to the second computer, the hash value being generated by encryption of a key associated with the second computer with an identifier that identifies the first computer, and
based on a response of the user to the request, selectively communicating the key to a browser of the first computer.

11. The system of claim 10, wherein the identifier that identifies the first computer comprises a processor number.

12. The system of claim 10, wherein the key indicates an address of a web site of the second computer.

13. The system of claim 10, wherein the second computer is located at a remote location relative to the first computer.

* * * * *